Sept. 8, 1936.                M. CHALLIER                2,053,392
                           METAL CUTTING TOOL
                          Filed Oct. 25, 1933           2 Sheets-Sheet 1
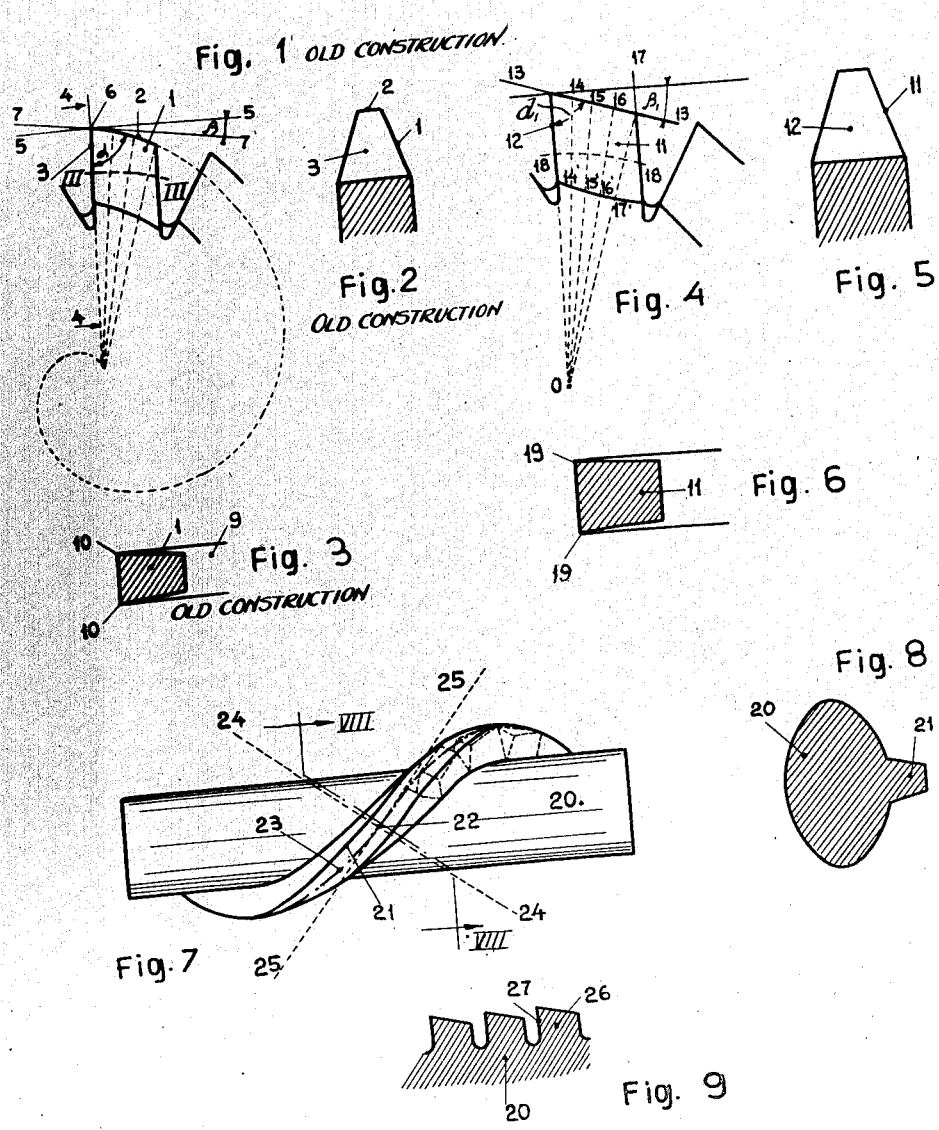

Patented Sept. 8, 1936

2,053,392

UNITED STATES PATENT OFFICE 2,053,392

METAL CUTTING TOOL

Mario Challier, Turin, Italy

Application October 25, 1933, Serial No. 695,173
In Italy April 8, 1933

10 Claims. (Cl. 29—103)

This invention relates to rotary tools, such as hobs, cutters, saws, reamers and the like, and more particularly to a novel generation of the teeth thereof with a view to increase efficiency and life.

The present invention has for an object to provide a rotary tool, in which the teeth are so shaped and relieved as to cut the material on which they are used with much less friction and wear than has heretofore been the case with ordinary rotary tools.

A further object of the present invention is to generate said teeth in such a way as to keep the profile strictly constant in the successive resharpenings.

Milling cutters of the so-called constant profile type are already known in the art; in said known cutters constancy of the profile is obtained by causing the profile lying in the axial plane to describe an Archimedes or logarithmic spiral lying in a plane normal to the tool axis.

Constant profile hobs are further known, in which the tooth is shaped by causing the profile lying in a plane normal to the helical axis of the rows of teeth to describe a curve of which the projection on the plane tangential to said axis is an Archimedes or logarithmic spiral.

The teeth thus shaped have the drawback that they cut in a tangential direction and impose, therefore, on the tool a considerable friction entailing a rapid wear thereof.

It has already been proposed to reduce friction and consequently wear of said tools by making the outer face and base of the teeth parallel to each other to obtain a rectilinear clearance. In these tools wear is reduced, but it is not possible to obtain a constant profile.

The method of shaping the teeth according to this invention has to a greater degree the advantages of the two known methods while obviating the drawbacks thereof, as will be better explained hereinafter.

The profile of the tooth according to this invention is obtained in the following manner. Considering first the simpler case of a cylindrical cutter: As the plane of the profile rotates about the tool axis, a point of the generator profile or a point of the plane in which the generator profile lies, in an invariable position with respect to said profile, runs along a straight line that will be referred to as directrix. This generates a tooth that will be referred to as a tooth backed-off with a rectilinear directrix. The plane in which the generator profile lies is preferably an axial plane.

In the case of a hob a point of the generator profile lying in a plane normal to the helical axis, or a point of said plane in a stationary position with respect to said profile runs along a line, of which the orthogonal projection on the plane tangential to said axis is a straight line. By anology the tooth will be called in this case also "a tooth backed-off with a rectilinear directrix".

If the point which we shall call "directing point" lies on the apex of the profile, the tooth will be a rectilinear clearance tooth, all the other points of the master generator or cutting profile run along curves having their concavity turned towards the rectilinear directrix, these curves being Nichomedes conchoids.

By "Nichomedes conchoid" is meant a curve generated as follows: A straight directrix line is drawn and a directing point is selected displaced from the line, and from the point lines are drawn to the directrix line. From the directrix line equal distances are laid off along each line drawn from the directing point, and a curve is drawn through the points so determined. This curve is a Nichomedes conchoid.

If the directing point be out of the master generator or cutting profile, all the points of the generator profile describe conchoids, of which the radii of curvature vary in accordance with their distance from the axis of rotation of the tool.

For the purpose of setting forth a clear description and understanding of the invention, I have shown the preferred general arrangement thereof in connection with a milling cutter and a hob, each in one piece, of the sort used for cutting gears, without any intention, however, to limit the scope of the invention to said embodiments.

Figure 1 is a fragmentary diagrammatic view showing a tooth of an ordinary cutter backed-off with an Archimedes spiral;

Fig. 2 is a front view thereof;

Fig. 3 is a section on line III—III of Fig. 1, the tooth being shown in the furrow it has cut in the blank;

Figs. 4, 5, and 6 are views similar to Figs. 1, 2, and 3 of a tooth backed-off with a rectilinear directrix according to this invention;

Fig. 7 shows diagrammatically a helical thread, from which the teeth of a hob are obtained, the thread pitch being somewhat exaggerated;

Fig. 8 is a section on line VIII—VIII of Fig. 7;

Fig. 9 is a fragmentary section on a tangent to the helical axis of the thread;

Figs. 10 and 11 show a tooth backed-off with a rectilinear directrix, in which the rectilinear directrix lies above the profile, in side and front view, respectively;

Figs. 12 and 13 show a tooth backed-off with a rectilinear directrix in which the straight directrix crosses the cutting profile;

Figs. 14 and 15 show a tooth backed-off with a multiple rectilinear directrix in side and front view, respectively;

Fig. 16 shows the finished cutter in perspective; and

Fig. 17 shows the finished hob in perspective view.

Referring more particularly to Figures 1 to 3, 1 denotes a tooth of an ordinary cutter with a curvilinear relief, of which the outer side 2 is an arc of an Archimedes spiral. The cutting profile 3 of said tooth lies in the radial plane, of which the projection on the plane of the drawing is indicated by 4—4. Given at 5—5 the perpendicular to the straight line 4—4 at the apex 6 of the cutting profile and at 7—7 the tangent to the Archimedes spiral at said point; $\alpha$ will be the cutting angle and $\beta$ the clearance angle.

Considering now the section of the tooth on the arc of circle III—III and indicating by 9 the furrow cut by the cutter in the work blank, it will be clearly seen that the sides of the tooth are tangential to the side walls of the furrow and the clearance angle (i. e., the angle made by the tangent in the apexes 10 of the profile with the side walls of the furrow) is very small. The tooth of the cutter is subject to friction on the sides and this entails a rapid and deep wear and an increased resistance against cutting.

This serious drawback is obviated by the cutter having teeth backed-off with a rectilinear directrix according to the present invention and shown in Figs. 4 to 6. The tooth 11 is shaped by the cutting profile 12, of which the apex runs along the rectilinear directrix 13—13, while the profile lying in the radial plane rotates about the axis 0 of the cutter. $\alpha_1$ is the cutting angle and $\beta_1$ the clearance angle.

Considering the successive radial sections of the tooth, it will be seen that to the points 14, 15, 16, 17 of the outer surface of the tooth there correspond at the base the points 14', 15', 16', 17'. The points 14' . . . 17' do not lie on a straight line, but are equidistant from their respective corresponding points 14—17, and are situated on a curve of which the concavity is turned towards the straight directrix 13—13; this curve, as will be easily understood, being a Nichomedes conchoid. All the intermediate sets of points of the successive cutting profiles describe curves of the same kind.

In the successive radial sharpenings the shape of the successive profiles obviously remain similar while the clearance angle is reduced; a sufficiently large relief or clearance angle should, therefore, be chosen for the initial profile in order to have at the last sharpening admitted by the strength of the tooth a clearance angle which is large enough to ensure an effective working.

This is also obtained by means of a larger number of shorter teeth; incidentally, this ensures a much more accurate work.

Considering the section (Fig. 6) through the circular section 18—18 (Fig. 4) it will be seen that the clearance angle at the sides is very large, so that the tooth is not subject to any friction on the sides and the cutting edges 19 only are operative.

In the tooth according to this invention one profile only is operative at a time. The successive profiles do not come into contact with the work and, therefore, do not generate friction and are not subject to wear. A slight radial resharpening of the tooth is thus sufficient to make the tool efficient again. The reduction in friction reduces the tendency of the tool to chatter. Practical considerations in each case will determine the best angles to be adopted, as well as the cutting profile point (or the point fixedly associated with said cutting profile) which moves on the rectilinear directrix.

A similar process is followed for sharpening the teeth of hobs, Figs. 7 to 9. 20 denotes the base cylinder, on which the initial thread 21 is shown. For clearness' sake one thread only has been shown and its pitch has been exaggerated. Considering a point 22 of the helicoidal center line 23 of the outer surface of the thread and drawing through this point the perpendicular 24—24 and the tangent 25—25 to the helicoidal axis 23, the tooth 26 is shaped by moving the cutting profile, lying in a plane passing through the normal line 24—24, keeping one of its points (or a point on its plane in a position invariable with respect to the profile) along a directrix line of which the projection on the plane passing through the tangent 25—25 is a straight line. In view of the limited tooth length, for practical purposes the directrix may be imagined as coinciding with its projection in the tangential plane.

Referring now to Figs. 10 and 11, 28 indicates the cutting profile and 29 a point in the same plane as said profile chosen out of said profile and fixed relative thereto. The tooth 30 according to this invention is shaped by moving the point 29 along the straight directrix 31—31; in this movement the top of the cutting profile 28 rotating about the axis 0 of the cutter takes successively the positions 32, 33, 34, and 35 and the bottom the corresponding positions 32', 33', 34' and 35', respectively. The lines connecting said series of points are conchoids and their concavity is turned towards the rectilinear directrix 31—31.

In Figs. 12 and 13 the straight directrix 36—36 crosses the cutting profile 37; in this case also the top 38 and bottom 39 of the tooth are conchoids with their concavities turned in opposite directions.

Referring again to Fig. 4, it will be seen that by the repeated sharpening the clearance angle diminishes. To prevent the clearance angle from becoming too small on the repeated sharpening, or to avoid too great an initial clearance angle, the arrangement shown in Figs. 14 and 15 may be resorted to, in which the straight directrix 40 is used only for part of the tooth, e. g. from the initial profile 41 to the section 42; the straight directrix 43 is then used up to the section 44. A tooth backed-off with a multiple rectilinear directrix is thus obtained, in which the control of the characteristics of the tooth is still greater, as the number, angle, position and length of directrices can be varied as required.

Fig. 16 shows in perspective a cylindrical cutter 47, of which the teeth 48 are obtained as shown in Figs. 4 to 6, and Fig. 17 shows in perspective a hob 49, of which the teeth 50 are obtained as shown in Figs. 7 to 9.

What I claim is:

1. A rotary tool having cutting teeth the backs of which conform to the surface generated by moving the generator profile with a combined movement of rotation about the tool axis and of radial translation so that a point in the plane of the generator profile follows a predetermined straight line directrix, the surface so generated being formed of lines which are conchoids, and the teeth always having similar cutting profiles upon successive radial resharpenings.

2. A rotary tool, comprising cutting teeth the backs of which conform to the surface generated by moving the generator profile of the tooth so that a point in the profile plane, having an invariable position with respect to said profile, follows a rectilinear directrix lying in a plane normal to the plane of the profile, and keeping the profile plane in a radial direction with respect to the axis of the tool, whereby all points of the generating profile generate conchoids of Nichomedes and all radial sections of the generated tooth are similar.

3. A rotary tool comprising cutting teeth the backs of which conform to the surface generated by moving a point of the cutting profile of the tooth along a rectilinear directrix lying in a plane normal to the plane of the profile, while at the same time keeping the cutting profile in a radial direction with respect to the axis of the tool, all other points of the cutting profile following conchoids, and all radial planes of the tool passing through the tooth producing similar sections.

4. A rotary tool comprising teeth in which the sides and outer surfaces are formed by series of Nichomedes conchoids, all sections of said teeth formed by planes radial to the tool being similar.

5. A rotary tool comprising teeth, of which the outer surfaces and sides are formed by straight lines and series of Nichomedes conchoids with respect to said straight lines, whereby said teeth have similar cutting profiles upon successive resharpenings in planes radial to the tool axis.

6. A rotary tool comprising teeth, of which the side faces and outer faces conform to surfaces generated by cutting profiles lying in axial planes and rotated about said axis as said profiles are displaced on said planes, so that each profile maintains a point fixed with respect to a corresponding rectilinear directrix lying on a plane normal to the tool axis, the lines formed by all points of said generating profiles in said movements being conchoids and all sections of said teeth cut by radial planes being similar.

7. A rotary tool comprising cutting teeth each conforming in shape to the surface formed by radially moving a cutting profile along a helical line, keeping a point of its plane on a directrix line, of which the projection on the plane tangential to the helical line at the point of intersection of the plane of the profile with said helical line, is substantially a straight line, the lines formed by all points of said profile in said movements being conchoids and sections of said tooth cut by planes perpendicular to the helical line being similar.

8. A rotary tool having cutting teeth the backs of which conform to the surface generated by moving the generator profile with a combined movement of rotation about the tool axis and of radial translation so that a point in the plane of the generator profile follows along a directrix comprising a series of angularly disposed intersecting straight lines, the surfaces so generated being formed of lines which are conchoids, and the teeth always having similar cutting profiles upon successive radial resharpenings.

9. A rotary tool comprising cutting teeth the outer surface of which is formed of conchoidal lines generated by the cutting profile of the tooth by moving a point of said cutting profile along a rectilinear directrix lying in a plane normal to the plane of the profile, while at the same time keeping the plane of the cutting profile in a radial direction with respect to the axis of the tool, said tooth having similar cutting profiles upon successive radial resharpenings.

10. A rotary tool comprising cutting teeth each having its outer surface conforming to the surface formed by tangentially moving the generating profile of the tooth along a helical line while maintaining the plane of the generating profile perpendicular to said helical line, and keeping a point of its plane on a directrix line, of which the projection on the plane tangential to the helical line at the point of intersection of the plane of the profile with said helical line is substantially a straight line, the outer surfaces of said teeth being formed of conchoidal lines and all sections of the teeth cut by planes perpendicular to the helical lines being similar.

MARIO CHALLIER.